(12) United States Patent
Turner et al.

(10) Patent No.: US 7,042,197 B2
(45) Date of Patent: May 9, 2006

(54) CONTROL CIRCUIT

(75) Inventors: Geoffrey Alan Turner, Lane Cove (AU); Trevor Anthony Smith, Lane Cove (AU)

(73) Assignee: Energy Storage Systems PTO LTD, Lane Cove (AU)

( * ) Notice: Subject to any disclaimer, the term of this patent is extended or adjusted under 35 U.S.C. 154(b) by 0 days.

(21) Appl. No.: 10/499,694

(22) PCT Filed: Dec. 23, 2002

(86) PCT No.: PCT/AU02/01762

§ 371 (c)(1),
(2), (4) Date: Aug. 13, 2004

(87) PCT Pub. No.: WO03/056684

PCT Pub. Date: Jul. 10, 2003

(65) Prior Publication Data

US 2004/0263127 A1    Dec. 30, 2004

(30) Foreign Application Priority Data

Dec. 21, 2001    (AU) .................................. PR9673

(51) Int. Cl.
*H02J 7/00*    (2006.01)

(52) U.S. Cl. ..................................... 320/136

(58) Field of Classification Search ............... 320/136, 320/167; 257/737
See application file for complete search history.

(56) References Cited

U.S. PATENT DOCUMENTS

| | | | | |
|---|---|---|---|---|
| 4,183,041 A | * | 1/1980 | Goel | 257/737 |
| 5,218,284 A | | 6/1993 | Burns et al. | 320/112 |
| 5,260,637 A | | 11/1993 | Pizzi | 320/103 |
| 5,572,108 A | * | 11/1996 | Windes | 320/167 |
| 5,714,863 A | | 2/1998 | Hwang et al. | 320/166 |
| 6,061,577 A | | 5/2000 | Andrieu et al. | 455/572 |

* cited by examiner

*Primary Examiner*—Pia Tibbits
(74) *Attorney, Agent, or Firm*—Kenyon & Kenyon LLP (57)    ABSTRACT

A control circuit (101) is configured for use with a load in the form of hardware (102) of a laptop computer (103). Circuit (101) includes input terminals (105, 106) for electrically connecting with respective terminals (107, 108) of a battery pack (109). The battery pack (109) supplies a battery current and has a predetermined maximum operational current. Circuit (101) also includes output terminals (111, 112) for electrically connecting in parallel hardware (102) and a supercapacitor (113). A controller (115) is disposed between the input and the output terminals for allowing the battery to transfer energy to hardware (102) and supercapacitor (113) while maintaining the battery current at less than the predetermined maximum operational current.

13 Claims, 3 Drawing Sheets

CONTROL CIRCUIT

FIELD OF THE INVENTION

The present invention relates to a control circuit and in particular to a control circuit for a load.

The invention has been developed primarily for a laptop computer that makes use of a variety of power/energy sources and will be described hereinafter with reference to that application. It will be appreciated, however, that the invention is not limited to that particular field of use and is also applicable to other portable computing devices, portable electronic devices, wireless devices, or those devices drawing power/energy from multiple and distinct storage elements or sources.

BACKGROUND TO THE INVENTION

With the increasing demand for portable computing devices and portable wireless computing devices, there has been considerable effort expended in the development of portable power supplies for such devices. The usual approach is to rely upon a battery pack that is periodically recharged from the mains supply. The battery pack typically includes a plurality of interlinked batteries in combination with protection circuitry to prevent the current provided by the batteries from exceeding a predetermined maximum operational current. If that minimum is exceeded, the protection circuitry isolates the batteries from the computing device. In some cases the circuitry also, after a delay, reconnects the batteries. In any case, the step of isolating the batteries from the device is that the device shuts dowry. Clearly, this is inconvenient to the user.

The load current drawn by computing devices varies greatly, and sharply, with time. This creates enormous voltage ripple for the battery pack. This, in turn, is not ideal for most batteries, many of which are best suited to provide steady current levels. Moreover, the peak load currents are often large in comparison to the average load current, although only of short duration. This requires that additional complexity be designed into the protection circuit to prevent undesirable triggering of that circuit.

There has been some evidence of the proposed use of supereapacitors to supply power to portable electronic devices, although as a source secondary to the battery pack. Such devices are usually accompanied by a second protection circuit to limit the flow of current to and from the supercapacitor. This circuitry tends to significantly degrade the effectiveness of the supercapacitor in these applications.

Any discussion of the prior art throughout the specification should in no way be considered as an admission that such prior art is widely known or forms part of common general knowledge in the field.

DISCLOSURE OF THE INVENTION

It is an object of the present invention, at least in the preferred embodiment, to overcome or ameliorate one or more of the disadvantages of the prior art, or to provide a useful alternative.

According to a first aspect of the invention there is provided a control circuit for a load, the circuit including:

input terminals for electrically connecting with respective terminals of a battery that has a predetermined maximum operational current whereby the battery supplies a battery current;

output terminals for electrically connecting in parallel the load and a supercapacitor; and a controller being disposed between the input and the output terminals for allowing the battery to transfer energy to the load and the supercapacitor while maintaining the battery current at less than the predetermined maximum operational current.

Preferably, the controller also prevents the supercapacitor from providing energy to the battery. More preferably, the circuit is a power-up protection circuit for a portable computing device.

Preferably also, the load draws a load current that varies with time, where the load current is the sum of the battery current and the current provided by the supercapacitor. More preferably, the load current is greater than or equal to zero and the controller maintains the battery current at greater or equal to zero. In other embodiments, the battery current is allowed to be negative, but only for small magnitude currents and for short periods of time.

In a preferred form, the predetermined maximum operational current is an average over a given interval. However, in other embodiments it is an instantaneous current.

Preferably also, the battery includes a plurality of battery cells. More preferably, the battery includes a protection circuit for electrically disconnecting the battery terminals from the input terminals in response to the predetermined maximum operation current being exceeded.

Preferably, the controller is responsive to the battery current for varying a resistance between the input and the output terminals. More preferably, the controller includes one or more solid-state devices for varying the resistance. Even more preferably, at least one of the solid-state devices is a MOSFET.

Preferably also, the load has a start up sequence and the at least one of the solid-state devices operates in a linear mode during that sequence. More preferably, the at least one solid state device is mounted to a heat sink.

According to a second aspect of the invention there is provided a control circuit for a load, the circuit including:

input terminals for electrically connecting with respective terminals of a battery that has a predetermined maximum operational current whereby the battery supplies a battery current;

output terminals for electrically connecting in parallel the load and a supercapacitor; and a solid state device through which the battery current flows between the input and the output terminals, the transistor being responsive to the battery current for varying the resistance of the transistor and thereby allowing the battery to transfer energy to the load while maintaining the battery current at less than the predetermined maximum operational current.

Preferably, the solid state device is a transistor, and more preferably a MOSFET. Even more preferably, the MOSFET is mounted to a heat sink.

According to a third aspect of the invention there is provided a control circuit for a computing device that derives power from a battery unit that has a battery and a protection circuit for isolating the battery from the device when predetermined maximum operational current is exceeded, the control circuit including:

input terminals for electrically connecting with respective terminals of the protection circuit to allow the battery to supply a battery current to the device;

output terminals for electrically connecting in parallel the load and a supercapacitor; and a controller being disposed between the input and the output terminals for allowing the battery to transfer energy to the load and the supercapacitor while maintaining the battery current at less than the predetermined maximum operational current.

According to a fourth aspect of the invention there is provided a portable computing device including:

a power source having at least two output terminals for supplying a source current of up to a predetermined maximum operational current;

computer hardware that includes a supply rail that draws a load current;

a supercapacitor in parallel with the supply rail; and a controller being disposed between the output terminals and the supply rail for allowing the source to transfer energy to the hardware and the supercapacitor while maintaining the source current at less than the predetermined maximum operational current.

According to a fifth aspect of the invention there is provided a control circuit for a load, the circuit including:

input terminals for electrically connecting with respective terminals of a battery that supplies a battery current, wherein the battery has a predetermined maximum operational current and a predetermined pulse current capacity;

output terminals for electrically connecting in parallel the load and a supercapacitor; and a controller being disposed between the input and the output terminals for allowing the battery to transfer energy to the load and the supercapacitor while controlling the battery current such that the battery remains within the predetermined pulse current capacity.

Preferably, the controller provides a current path for the battery current between the input and the output terminals and is responsive to both the quantum and duration of the battery current for varying the resistance of the path. More preferably, the resistance of the path is varied once the predetermined pulse current capacity has been reached. Even more preferably, the resistance of the path is varied to maintain battery current below the predetermined maximum operation current.

BRIEF DESCRIPTION OF THE DRAWING

A preferred embodiment of the invention will now be described, by way of example only, with reference to the accompanying drawings in which.

DETAILED DESCRIPTION OF THE PREFERRED EMBODIMENTS

Figure 1:
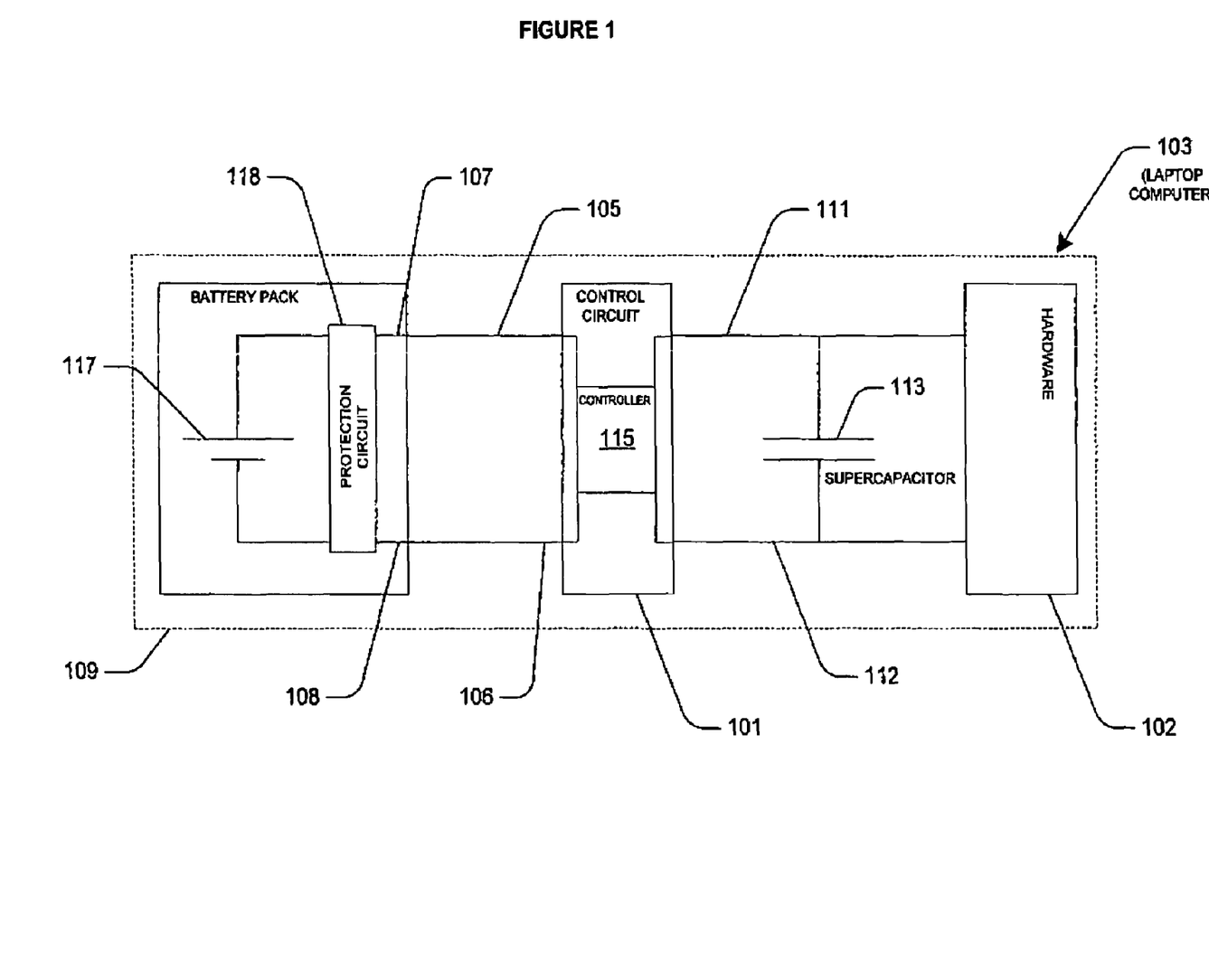
FIG. 1 is a block diagram of a portable computing device according to the invention.

Reference is made to FIG. 1 where there is illustrated a control circuit 101 for a load in the form of hardware 102 of a laptop computer 103. Circuit 101 includes input terminals 105 and 106 for electrically connecting with respective terminals 107 and 108 of a battery pack 109. The battery pack 109 supplies a battery current and has a predetermined maximum operational current. Circuit 101 also includes output terminals 111 and 112 for electrically connecting in parallel hardware 102 and a supercapacitor 113. A controller 115 is disposed between the input and the output terminals for allowing the battery to transfer energy to hardware 102 and supercapacitor 113 while maintaining the battery current at less than the predetermined maximum operational current.

Supercapacitor 113 provides a smoothing effect for the supply voltage across terminals 111 and 112. That is, the current demand of hardware 102 varies considerably over very short time periods and supercapacitor 113 is able to provide an averaging affect to the battery current. This is achieved due to the low ESR and high capacitance of the supercapacitor. Moreover, supercapacitor 113 is of significantly smaller volume than prior art smoothing devices such as electrolytic capacitors or other capacitors, and even other supercapacitors. This is particularly significant in portable electronics applications such as those contemplated for the preferred embodiments.

A supercapacitor for use in the preferred embodiment includes is rated at about 3 Farads, and has dimensions of 150 mm×180 mm×1.5 mm. In other embodiments use is made of alternative supercapacitors having different capacities and dimensions. For example, with loads other than laptop computers, such as a PDA, the power requirements and physical size of the load is much smaller, and smaller supercapacitors are used.

Pack 109 includes a rigid plastic housing that contains a bank of batteries and/or other energy storage devices 117 that are disposed in parallel with a protection circuit 118. As will be appreciated by those skilled in the art, pack 109 is typically removably received within a complementary port (not shown) of computer 103.

Circuit 118 is connected in parallel with terminals 107 and 108. The function of circuit 118 is to protect batteries 117 from an over-current condition, which is defined as being a current greater than or equal to the predetermined maximum operational current. This is particularly important for some battery types, such as Li-Ion batteries, where an over-current condition can quickly and easily irreversibly damage the battery and compromise its subsequent performance. In more extreme cases, such conditions render the battery inoperative. Circuit 118 is typically built into the pack 109.

Once circuit 118 detects that the battery current is equal to or greater than the predetermined maximum operational current, it electrically isolates batteries 117 from terminals 107 and 108. Once this occurs, the energy stored within supercapacitor 113 will within seconds quickly drain to a point where the voltage across that supercapacitor will not be sufficient to sustain operation of hardware 102. This has the effect of removing power from hardware 102.

Pack 109 is usually designed such that the over-current condition is not likely to be experienced during normal operating conditions. However, with supercapacitor 113 in parallel with the load, the effective resistance, as seen by the battery, will be very low. Accordingly, if supercapacitor 113 is uncharged or at a low state of charge, the inrush current will typically exceed the predetermined maximum operational current. As supercapacitor 113 will usually be in a low state of charge when a user powers-up hardware 102, circuit 101 will be called into operation at that time.

In other embodiments, circuit 101 is applied to other load such as PDA's, PC cards, Compact Flash cards, and other wireless electronic devices. Circuit 101 is particularly advantageously applied to digital circuits, as these tend to draw peak currents for short periods. That is, the benefits of a high capacitance low ESR supercapacitor are significant, as to is the inclusion of a protection circuit, such as circuit 101, to ensure that currents are maintained within specification without having to redesign or upgrade battery pack 109. This retrofit functionality allows circuit 101 to be easily included within existing products. Moreover, as the preferred supercapacitors are thin—in the order of about 1 mm—it is relatively straightforward to incorporate these components into an existing product to provide superior performance.

In those embodiments where circuit 101 and supercapacitor 113 are, in the first instance, integrally designed with the other components shown, it is possible to combine circuit 101 and circuit 118.

Figure 2:
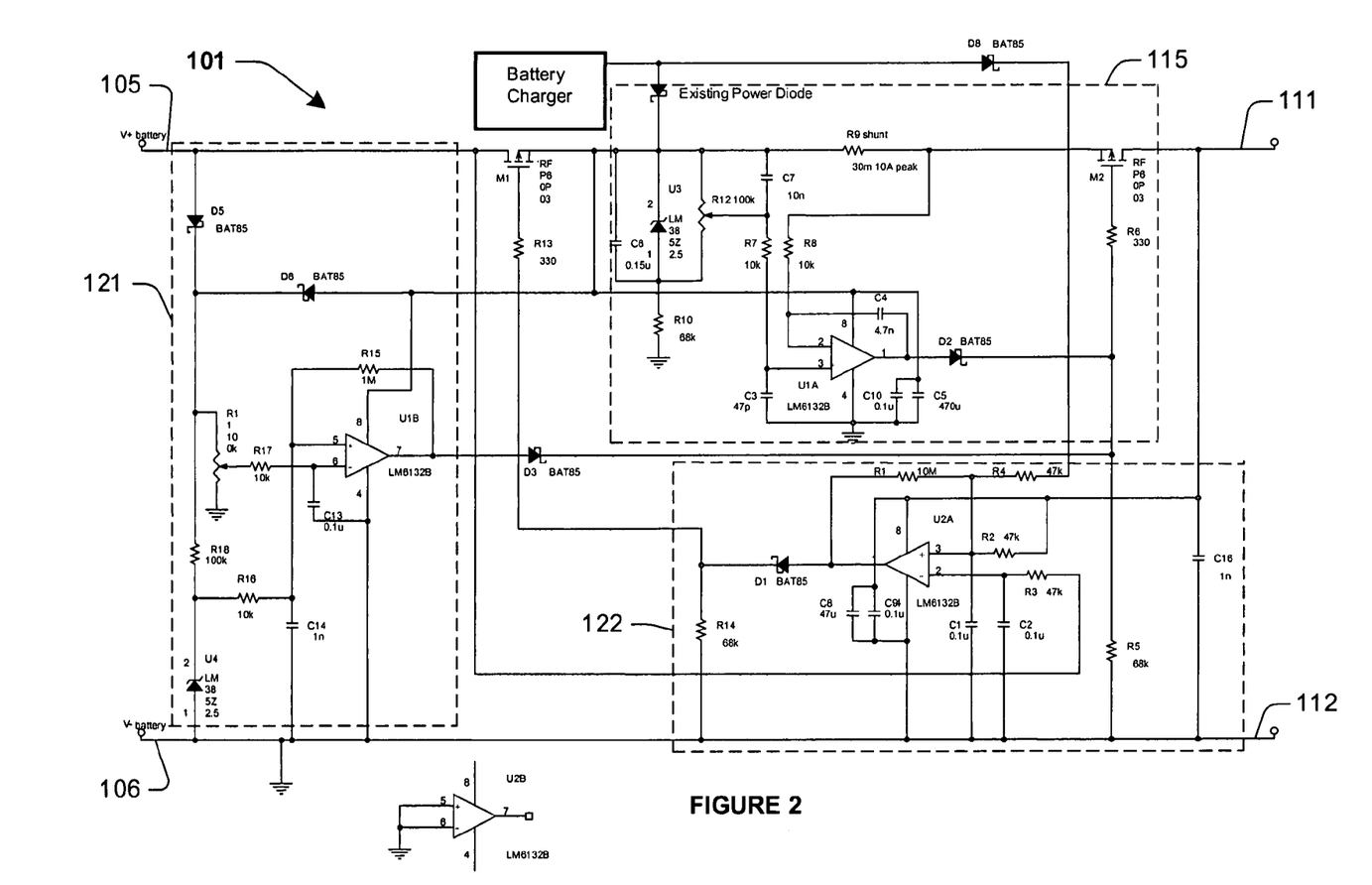
FIG. 2 is a schematic circuit diagram of the control circuit of FIG. 1.

Control circuit 101 is shown in more detail in FIG. 2, where corresponding features are denoted by corresponding reference numerals.

It will be appreciated by those skilled in the art that the battery pack has a plurality of batteries and protection circuitry to provide a predetermined maximum operational current for the batteries. That maximum current is typically determined by the type and capacity of the batteries themselves. The intention of the maximum is to prevent the battery pack from supplying a current that would degrade or destroy the batteries.

Circuit 101 includes controller 115 that operates to provide the above functionality. The positive terminal (pin 3) of amplifier U1A is responsive to a reference voltage that is derived from the voltage on one side of shunt resistor R9, the reference being generated by LM385Z2.5 and the surrounding resistor network. The negative terminal of amplifier U1A (pin 2) is responsive to the voltage on the other side of resistor R9. Under normal operating conditions, with battery pack 109 supplying the required current below the predetermined maximum operational current, the output of amplifier U1A will be low (as the voltage at pin 2 is greater than the voltage at pin 3). Hence, M2 will be on, and the voltage at terminal 111 will be only slightly less than the voltage at terminal 105.

The MOSFET switches M1 and M2 are of the type that are used in notebook computer power inputs, although with a number of important variations, as will be discussed below. While use is made, in this embodiment, of two such switches, in other embodiments a different number is used. In other designs, these switches are used as switches only—that is, they are either in an ON state or an OFF state. The switch M2 in this embodiment, however, operates additionally in a linear state between the other two states.

In normal operation, both M1 and M2 are fully ON. That is, when the battery pack is able to supply the total combined current requirements of load 102, supercapacitor 113 and circuit 101. However, when M2 is used to limit the current to the supercapacitor and load—that is, when the combined current load being drawn from battery pack 109 would exceed the predetermined maximum operational current—it is used as a linear control device. It also functions in this way while the supercapacitor is being charged from the battery charger. Due to the resistance provided by M2 in this third state, it is mounted to a heat-sink that is adequate to allow it to function for the length of time required to effect full charging of the supercapacitor.

In this embodiment, M1 and M2 are RFP60P03 type devices. However, in other embodiments use is made of surface-mount types RF1S60P03. These are P-channel 60 Amp 27 mΩ devices, capable of dissipating up to 176 Watts. They also have relatively low gate threshold voltage (−4 Volts maximum). In other embodiments use is made of alternative MOSFETs. In even further embodiments, use is made of bipolar transistors.

The operational amplifiers in circuit 101 have been chosen to accept rail-to-rail input voltages. In this embodiment, use is made of type LM6132 amplifiers. These are high-bandwidth amplifiers that have high input impedance and require low power, making them suitable for use with batteries. They operate from supply voltages from approximately 2.7 Volts to 24 Volts, which is well outside the required range of this circuit.

Note that the differential input voltages of these amplifiers should not exceed 15 Volts. It is also preferable that the inputs of an unused amplifier be connected to the same supply rail.

Low-power 2.5 Volt reference voltages for the current limit and low-voltage detection are provided by U3 and U4, which are LM385Z2.5 type amplifiers.

Dual operational amplifiers U1A and U1B take their supply from the left of the shunt resistor, to enable them to control M2. U2A takes its supply from the right of M2, to allow it to turn off M1 completely when the battery voltage is lower than that on the supercapacitor, or when the charger is supplying power.

The shunt resistor is selected such as to drop a suitable voltage when the expected current is passed through it, and its power rating must be sufficient to dissipate the expected RMS power losses resulting from the current. The 30 mΩ shunt used in this embodiment drops 300 mV when a 10 Amp battery current is flowing. This will cause 3 Watts of heat dissipation. The operational amplifiers have an input offset voltage rating of up to 8 mV (maximum). Therefore, there may be an error of up to 267 mA in the current measurement resulting from the input offset current. However, as the battery current reaches about 7 Amps to 10 Amps, this amount of error is acceptable. In other applications use is made of operational amplifiers with lower offset currents to reduce the current error referred to above.

The current-limit function is performed by U1A. It compares the voltage drop across the shunt with the divided value of the reference voltage. It operates when the current is flowing from left to right in FIG. 2, so the shunt voltage is positive on the left, which is what happens when the supercapacitor is being charged. If the current exceeds the reference value for a time determined by its RC time constant, its output swings high to turn off M2. In this embodiment, capacitor C4 and resistor R8 determine the time constant. If the time constant is short enough, as is the case in this embodiment, the control is smooth and linear. Some caution is required, for if a long time constant is used, the control output may become oscillatory. In those embodiments where fast control is critical, C4 has a low value, while in further embodiments, C4 is omitted. It will be appreciated by those skilled in the art that this time constant is altered to suit the application.

Having a non-zero time constant means that the circuit will not react instantly to current pulses that exceed the predetermined maximum operations current that is set by the reference input. This provides some immunity to high current pulses that are short enough not to be of concern. The maximum current, though, is set high enough to support the maximum short-term average current the load draws in normal operation, otherwise the current limit will operate, causing the voltage to drop and the system to malfunction.

That is, batteries 117 are able to accommodate, without sustaining damage, pulse loads where over-current conditions exist. However, this on the proviso that that load has a short duration. Typically, protection circuit 118 is configured to allow higher currents to flow for a predetermined time, where that time is dependent upon the magnitude of the current.

The magnitude of the predetermined maximum operational current is set by the potentiometer R12. The greater the voltage across C7, the greater will be the current before U1A begins to turn off M2. In other embodiments, R12 is substituted by two equivalent but discrete resistors, both with approximately the same total resistance.

Circuit 101 also includes a low-voltage lockout circuit 121 that is centred about operational amplifier U1B. More particularly, amplifier U1B is used as a comparator, and performs the low-voltage lockout or shut-down function. The battery and charger voltages are applied via Schottky diodes to a potentiometer R1. In other embodiments the potentiometer is replaced with resistors. The higher voltage of the respective voltages provided by the battery and the charger is used to determine whether to turn off M2. If the higher of these two voltages is lower than the reference at pin 5 of U1B by an amount modified by a hysteresis feedback resistor R15, the output of U1B goes high, turning off M2.

The higher of the two voltages applied to pin 6 of U1B has to increase beyond the original value before M2 will be turned on again. This prevents rapid spurious switching during transients. In those embodiments where an increased hysteresis effect is required, R15 is reduced in value. Conversely, in those embodiments where a reduced hysteresis effect is required, R15 os increased in value.

Capacitor C13 filters the voltages applied to pin 6 of U1B. The greater the value of C13, the larger the effective time-constant of C13 and the combination of R17 and R11 will be. In turn, the longer the time constant, the longer the circuit will take to respond to a voltage drop below the pre-set level. The filtering therefore helps to prevent unnecessary shutdowns caused by short transients in voltage.

Circuit 101 also includes a reverse current detection circuit 122 that is based around U2A. This circuit 122 allows protection of the batteries from reverse current. To provide this functionality, U2A is also used as a comparator. It turns off M1 when the voltage on supercapacitor 113 and load 102 is greater than that provided by battery pack 109. It also turns off M1 when the voltage on the charger input is high enough to power the circuit. The charger's power input is monitored via Schottky diode D8. Because this diode carries very little current, the cathode of D8 will be at a higher voltage than the cathode of the device's existing input power diode when power is being supplied by the charger. Either a high supercapacitor voltage or a high charger voltage causes U2A to switch its output high.

The theoretical value of the current limit provided by circuit 115 is determined from the shunt resistor's value and the voltage drop across C7 (across the upper part of the potentiometer/resistor divider). The current at which limiting begins is:

$$I_{lim} = V_{C7}/R_9.$$

The likely error in this value is determined mainly by the offset voltage of the operational amplifier.

In cases where the circuit of FIG. 2 is retrofitted to a laptop computer the actual value of the current limit is best conformed by measurement. This includes connecting a battery or power supply to the battery input, then noting the value at which the current limits when a load (or short-circuit) is applied to the supercapacitor (load) terminals. The current should be just below the continuous value that will cause the battery to shut down. In other embodiments where the circuit of FIG. 2 is designed as an integrated component, the relevant values would be known.

The value of the time constant in the current limit circuit is determined by R8×C4. C4 is, in some embodiments, omitted for fast response. In those cases where this omission causes limiting in normal operation because of fast transient currents, then a value of C4 is added that is sufficient to prevent limiting during very short transients. The size of C4 is determined analytically, and is preferably as small as it can possibly be without the limiting occurring.

When a discharged supercapacitor is connected to the supercapacitor terminals and the battery is connected to its terminals, the current limits to the desired value without being sufficient to cause the circuit 109 to shut down further battery current. C4 is small enough that the limiting acts quickly, preventing battery shutdown. This allows the supercapacitor to charge or recharge as quickly as possible without causing premature shut down of the laptop.

The reference voltage used by the circuit of FIG. 2 to determine a cutoff voltage is determined by the component LM385Z2.5. Once the desired cutoff voltage is known, the resistor values substituted for R11 are determined as follows.

1. If there is no hysteresis (R15 is absent), then the divided value of the supply presented to pin 6 of U1B is equal to 2.5 Volts, the reference voltage.

2. With hysteresis this value is reduced slightly by approximately $(2.5 \times R16)/(R16+R15)$, the hysteresis voltage.

With the values in the circuit, there is approximately a 1% hysteresis, or 25 mV. Allowance is made for the offset voltage of the amplifier, which is 8 mV (maximum).

The time constant of the low-voltage cutoff is determined by R11, R17 and C13. In other embodiments, R11 is effectively the parallel combination of the two resistors that replace the one shown. The total value of this equivalent resistor plus R17 is then multiplied by C13. This time constant is selected to be approximately the desired response time to short-term voltage drops. If it is less than this time, then the circuit will tend to shut down the supply to the load during such voltage drops.

This circuit also allows for customisation of the hysteresis in the reverse-current protection circuit. This value is determined from the ratio $R2/(R1+R2)$ for the supercapacitor's voltage, or $R4/(R1+R4)$ for the battery charger input. The ultimate value needs to be large enough to prevent the circuit from turning off M1 unnecessarily during voltage transients, but not so large that the supercapacitor/load voltage has to drop very much before the battery is re-connected.

It has been found during the development of the preferred embodiment that high ripple currents in notebooks and other portable electronic and computing devices is drastically reduced by the use of a supercapacitor in parallel with the supply. The reduction in the magnitude of ripple currents provides:

1. A reduced risk of premature shutdown
2. Improved efficiency, especially with reduced battery voltages
3. Small increases in battery run-time
4. Increased battery life due to reduced current peaks.

However, a supercapacitor needs to be charged on power-up. Accordingly the current-limiting charging circuit with low-voltage lockout and reverse-current protection, such as that illustrated in FIG. 2, is used in portable devices to prevent the needless switching of the batteries and the consequent shut down of the device.

The circuit of FIG. 2 also performs the power-selection function, routing power from the battery or the charger/adapter, if connected. It has low current drain, which makes it suitable for use in battery-powered devices. As described above, the circuit is open to be tailored to suit different batteries and loads. Moreover, it uses some of the components already present in most notebook computers for the power-selection function.

The CPUs and other devices in notebook computers draw high currents that vary enormously. These generate high levels of voltage ripple in the supply. Placing a very low-ESR supercapacitor in parallel with the DC power input reduces the voltage ripple by a factor of 7 to 10 times, and reduces the battery current peaks by a comparable amount.

Reducing the voltage ripple enables designers to reduce the voltage margin before the system shuts down, without the risk that a voltage droop caused by a current peak will crash the system. This yields additional run-time, by using energy remaining in the battery. It also provides opportunities to improve the efficiencies in the downstream DC-DC converters, particularly if a reduced battery voltage is used. (Reduced voltage results in reduced current peaks in the circuit board traces, inductors and decoupling capacitors, which gives reduced $I^2R$ losses.) The reduced current peaks demanded from the battery also extend battery life.

It is necessary to charge the supercapacitor to the supply voltage when the system is turned ON. If it were connected directly to the battery or the charger, the current drawn would be very high. Therefore, it is necessary to limit the charging current until the supercapacitor is charged.

The supercapacitor has a voltage rating that must not be exceeded. Therefore, it is necessary that any charger that is used does not charge the supercapacitor to a higher voltage than this rating.

If a battery is inserted that has a lower voltage than that on the supercapacitor, it is necessary to prevent a large current flowing from the supercapacitor into the battery. It is usual for the supercapacitor voltage to be higher than the battery voltage if the load was previously powered by a battery-charger. Another situation where this voltage condition occurs is when a fresh battery had been in use, and it was quickly removed and replaced with a near-depleted battery. That is, if the system is drawing very little power, the supercapacitor will, in all likelihood, not have discharged sufficiently in the time it takes to insert the other battery.

When the battery's voltage drops to a low level, it is necessary to shut down the supply to the device, to prevent possible damage to the battery. This low-voltage lockout should also operate if the system is being powered by the battery-charger. That is, the presence of a low voltage suggests there is a fault in the charger or load. Also, the load—that is the laptop—will not function correctly when the voltage is low, because part or all of it will shut down.

The circuit of FIG. 2 is for a notebook computer, but other embodiments are used in power supply circuits for other portable devices. The circuit limits the battery current to the supercapacitor and the system while the supercapacitor is charging.

The circuit has reverse-current protection that prevents large currents flowing from the supercapacitor to the battery. It does this by detecting when the voltage on the supercapacitor is higher than that of the battery. Since the conduction path between the supercapacitor and the battery has low impedance, there is necessarily a small current flowing in that direction before the voltage difference is large enough to cause the circuit to activate. However, this current is small and will not be enough to damage the batteries or activate any of the battery protection circuitry.

The circuit also has a low-voltage lockout function that cuts off the load when the supply voltage drops below a pre-determined level.

The circuit for the battery-charger is not covered, but it will be understood that it connects to the battery, in use, via a charging circuit that is not shown in the Figure. The battery-charger should not be permitted to supply more than the rated voltage to the supercapacitor used on the internal DC supply. In one embodiment this is achieved by adding a simple linear voltage regulator to the output from a standard regulator. Another embodiment includes a modification to the circuit of the battery-charger so that its output is the correct voltage. The latter minimises the heat generated by the charger's circuit.

Figure 3:
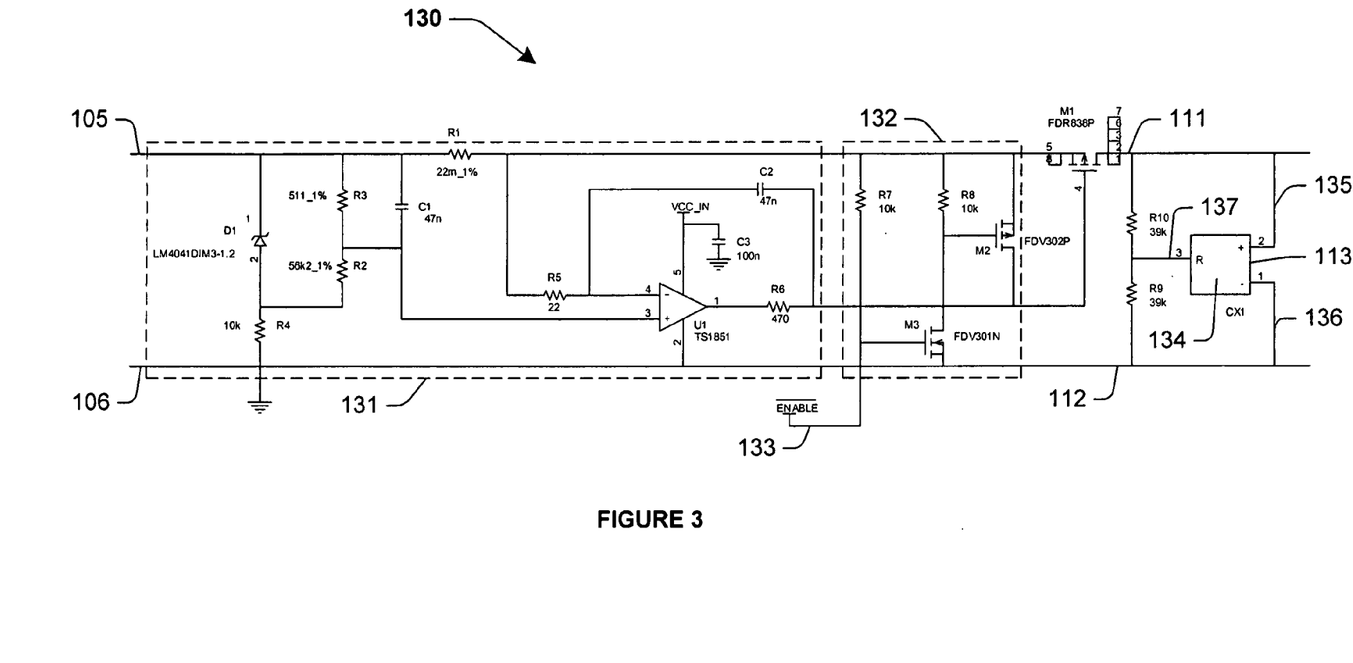
FIG. 3 is a schematic circuit diagram of an alternative control circuit according to the invention.

An alternative embodiment of the invention, in the form of a control circuit 130, is shown in FIG. 3. It will be appreciated that corresponding features are denoted by corresponding reference numerals. Circuit 130 is used as a substitute for circuit 101 in FIG. 1, where the application demands.

Circuit 130 includes a controller 131 that is based around U1 of FIG. 3. This operational amplifier is configured as a comparator and compares a reference voltage—that is provided by D1 and the associated resistors—with the voltage on the opposite terminal of a shunt resistor R1. The output of U1 (pin 1) drives M1 (pin 4) into an ON mode or an OFF mode. This is similar to operation of circuit 115 of FIG. 2, as U1 is also set up to drive M1 in a linear mode.

When the output or U1 is high—due to too much current flowing in R1—M1 is off and battery pack 109 is effectively electrically isolated from load 102 and supercapacitor 113. In normal operating conditions, the output or U1 is low, and M1 is ON to allow the battery pack 109 is supply the battery current to load 102 and supercapacitor 113. When the battery current approaches the predetermined maximum operational current, U1 drives M1 to vary its resistance so that the battery current is maintained below the predetermined maximum.

At start up, it takes some time for U1 to become operational. However, capacitor C2, in addition to providing a hystersis effect for U1, also ensures that, at start up, pins 4, 5 and 8 of M1 are maintained at a similar voltage. The small value of C2 ensures that M1 is, after a very small initial delay, switched OFF. During that initial delay there will be a small peak of battery current. As this current is allowed to flow for only a short period—due to the small size of C2—the risk of triggering circuit 118 is low.

Circuit 130 also includes an enable circuit 132 having an external input 133. In the event input 133 is held low or left floating circuit 132 is inactive and has no effect. However, when input 133 is held high, it disables circuit 130 by turning M1 OFF. For example, in some embodiments, terminals 111 and 112 supply power to a load that is a wireless transmitter (not shown) that has both control circuitry and transmission circuitry. Typically, it is the latter that consumes substantially more peak power and it is not powered up until the control circuitry has conducted pre-processing and set-up routines. The control circuitry is connected with input 133, and holds this high while the set-up routines are run. Once these have come to a satisfactory conclusion, the control circuitry takes input 133 low to enable circuit 130 to supply power to the transmission circuitry.

While circuit 130 is a general purpose circuit, it has particular application to PC cards or CompactFlash cards.

Supercapacitor 113 includes two supercapacitive cells (not shown) that are connected in series in a single package 134. Extending from the package is a positive terminal 135 that is connected to terminal 111 and a negative terminal 136 that is connected to terminal 112. A third terminal 137 extends from the junction of the two cells and is connected to the junction of resistors R9 and R10. Those resistors define a resistive balance to ensure that the cells are maintained at substantially equal voltages.

Although the invention has been described with reference to specific examples, it will be appreciate by those skilled in the art that it may be embodied in many other forms.

The invention claimed is:

1. A control circuit for a load, the circuit including:
   input terminals for electrically connecting with respective terminals of a battery that has a predetermined maximum operational current whereby the battery supplies a battery current;
   output terminals for electrically connecting in parallel the load and a supercapacitor; and
   a controller being disposed between the input and the output terminals for allowing the battery to transfer energy to the load and the supercapacitor while maintaining the battery current at less than the predetermined maximum operational current wherein the load draws a load current that varies with time, where the load current is the sum of the battery current and the current provided by the supercapacitor; and
   wherein the load current is greater than or equal to zero and the controller maintains the battery current at greater or equal to zero.

2. A circuit according to claim 1 wherein the controller also prevents the supercapacitor from providing energy to the battery.

3. A circuit according to claim 1 that is a power-up protection circuit for a portable computing device.

4. A circuit according to claim 1 wherein the predetermined maximum operational current is an average over a given interval.

5. A circuit according to claim 1 wherein the predetermined maximum operational current is an instantaneous current.

6. A circuit according to claim 1 wherein the battery includes a plurality of battery cells.

7. A circuit according to claim 1 wherein the battery includes a protection circuit for electrically disconnecting the battery terminals from the input terminals in response to the predetermined maximum operational current being exceeded.

8. A circuit according to claim 1 wherein the controller is responsive to the battery current for varying a resistance between the input and the output terminals.

9. A circuit according to claim 8 wherein the controller includes one or more solid-state devices for varying the resistance.

10. A circuit according to claim 9 wherein at least one of the solid-state devices is a MOSFET.

11. A circuit according to claim 9 wherein the load has a start up sequence and the at least one of the solid-state devices operates in a linear mode during that sequence.

12. A circuit according to claim 1 wherein the battery has a battery voltage and the supercapacitor has a supercapacitor voltage and wherein when the battery current is greater than zero the supercapacitor voltage is substantially equal to or less than the battery voltage.

13. A circuit according to claim 12 wherein the battery voltage is greater than approximately 2.7 Volts and less than approximately 24 Volts.

* * * * *

UNITED STATES PATENT AND TRADEMARK OFFICE
CERTIFICATE OF CORRECTION

PATENT NO. : 7,042,197 B2
APPLICATION NO. : 10/499694
DATED : May 9, 2006
INVENTOR(S) : Turner et al.

It is certified that error appears in the above-identified patent and that said Letters Patent is hereby corrected as shown below:

| Column | Line | |
|---|---|---|
| 1 | 24 | Change "mains" to --main-- |
| 1 | 32 | Change "dowry" to --down-- |
| 1 | 45 | Change "supereapacitors" to --supercapacitors-- |
| 4 | 63 | Change "as to is" to --as is-- |
| 5 | 35 | Change "are" to --is-- |
| 7 | 5 | Change "centred" to --centered-- |
| 7 | 23 | Change "os" to --is-- |
| 10 | 38 | Change "hystersis" to --hysteresis-- |

Signed and Sealed this

Second Day of January, 2007

JON W. DUDAS
*Director of the United States Patent and Trademark Office*